United States Patent
Srinivasan et al.

(10) Patent No.: US 7,330,862 B1
(45) Date of Patent: Feb. 12, 2008

(54) ZERO COPY WRITE DATAPATH

(75) Inventors: Mohan Srinivasan, Cupertino, CA (US); Jeffrey S. Kimmel, Chapel Hill, NC (US); Yinfung Fong, Campbell, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 573 days.

(21) Appl. No.: 10/423,381

(22) Filed: Apr. 25, 2003

(51) Int. Cl.
G06F 12/00 (2006.01)

(52) U.S. Cl. ..................................... 707/205
(58) Field of Classification Search ................ 707/205
See application file for complete search history.

(56) References Cited

U.S. PATENT DOCUMENTS

| | | | |
|---|---|---|---|
| 5,163,131 A | 11/1992 | Row et al. | |
| 5,355,453 A | 10/1994 | Row et al. | |
| 5,485,579 A | 1/1996 | Hitz et al. | |
| 5,802,366 A | 9/1998 | Row et al. | |
| 5,819,292 A | 10/1998 | Hitz et al. | |
| 5,931,918 A | 8/1999 | Row et al. | |
| 5,941,972 A | 8/1999 | Hoese et al. | |
| 5,948,110 A | 9/1999 | Hitz et al. | |
| 5,950,225 A | 9/1999 | Kleiman | |
| 5,963,962 A | 10/1999 | Hitz et al. | |
| 6,038,570 A | 3/2000 | Hitz et al. | |
| 6,065,037 A * | 5/2000 | Hitz et al. .................. | 709/200 |
| 6,138,126 A | 10/2000 | Hitz et al. | |
| 6,289,356 B1 | 9/2001 | Hitz et al. | |
| 6,389,433 B1 * | 5/2002 | Bolosky et al. .............. | 707/205 |
| 6,425,035 B2 | 7/2002 | Hoese et al. | |
| 6,868,417 B2 * | 3/2005 | Kazar et al. .................. | 707/10 |
| 2002/0112022 A1 | 8/2002 | Kazar et al. | |
| 2002/0116593 A1 | 8/2002 | Kazar et al. | |

OTHER PUBLICATIONS

Maintenance Procedures ND (8C) nd-network disk control Feb. 1985.
Misc. Reference Manual Pages ND (4P) nd-network disk driver Jul. 26, 1985.
Asante EN/SC Adapter Family Installation Guide May 1994.
Asante Desktop EN/SC Adapters User's Manual Apr. 1996.
Performance Without Compromise: The Virtual Storage Architecture 1997.
Anthony J. McGregor Department of Computer Science, University of Waikato Dissertation: Block-Based Distributed File Systems Jul. 1997.

(Continued)

*Primary Examiner*—William Lee
*Assistant Examiner*—Angela M Lie
(74) *Attorney, Agent, or Firm*—Cesari and McKenna LLP

(57) ABSTRACT

A technique enhances a write data path within a storage operating system executing on a storage system. As used herein, the write data path defines program logic used by a file system of the storage operating system to process write requests directed to data served by the file system. The technique enhances the write data path of the storage system by providing a "zero copy" write data path embodied as a function of the storage operating system that eliminates a copy operation for a write request received at the storage system. The eliminated operation is a data copy operation from a list of input buffers to buffers used by the file system.

30 Claims, 5 Drawing Sheets

OTHER PUBLICATIONS

David Hitz et al. TR3002 File System Design for a NFS File Server Appliance published by Network Appliance, Inc.

Fielding et al. (1999) Request for Comments (RFC) 2616, HTTP/1.1.

U.S. Appl. No. 10/216,453, filed Aug. 9, 2002, Vijayan Rajan et al.

U.S. Appl. No. 10/215,917, filed Aug. 8, 2002, Brian Pawlowski et al.

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.

* cited by examiner

ZERO COPY WRITE DATAPATH

FIELD OF THE INVENTION

The present invention relates to storage systems and, more particularly, to storing information on storage systems.

BACKGROUND OF THE INVENTION

A storage system is a computer that provides storage service relating to the organization of information on writable persistent storage devices, such as memories, tapes or disks. The storage system is commonly deployed within a network attached storage (NAS) or storage area network (SAN) environment. A SAN is a high-speed network that enables establishment of direct connections between a storage system, such as an application server, and its storage devices. The SAN may thus be viewed as an extension to a storage bus and, as such, a storage operating system of the storage system enables access to stored information using block-based access protocols over the "extended bus". In this context, the extended bus is typically embodied as Fibre Channel (FC) or Ethernet media (i.e., network) adapted to operate with block access protocols, such as Small Computer Systems Interface (SCSI) protocol encapsulation over FC or Transmission Control Protocol/Internet Protocol (TCP/IP)/Ethernet.

SCSI is a peripheral input/output (I/O) interface with a standard, device independent protocol that allows different peripheral storage devices, such as disks, to attach to the storage system. In SCSI terminology, clients operating in a SAN environment are initiators that initiate requests and commands for data. The storage system is a target configured to respond to the requests issued by the initiators in accordance with a request/response protocol. The SAN clients typically identify and address the stored information in the form of blocks or disks by logical unit numbers ("luns").

When used within a NAS environment, the storage system may be embodied as a file server including a storage operating system that implements a file system to logically organize the information as a hierarchical structure of directories and files on, e.g., the disks. Each "on-disk" file may be implemented as a set of data structures, e.g., disk blocks, configured to store information, such as the actual data for the file. A directory, on the other hand, may be implemented as a specially formatted file in which information about other files and directories are stored.

The file server, or filer, of a NAS system may be further configured to operate according to a client/server model of information delivery to thereby allow many client systems (clients) to access shared resources, such as files, stored on the filer. In the client/server model, the client may comprise an application executing on a computer that "connects" to the filer over a computer network, such as a point-to-point link, shared local area network, wide area network or virtual private network implemented over a public network, such as the Internet. The clients typically communicate with the filer by exchanging discrete frames or packets of data according to pre-defined protocols, such as the TCP/IP.

NAS systems generally utilize file-based protocols to access data stored on the filer. Each NAS client may therefore request the services of the filer by issuing file system protocol messages (in the form of packets) to the file system over the network. By supporting a plurality of file system protocols, such as the conventional Common Internet File System (CIFS), the Network File System (NFS) and the Direct Access File System (DAFS) protocols, the utility of the filer may be enhanced for networking clients.

A common type of file system is a "write in-place" file system, an example of which is the conventional Berkeley fast file system. In a write in-place file system, the locations of the data structures, such as inodes and data blocks, on disk are typically fixed. An inode is a data structure used to store information, such as metadata, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not over-write data on disks. If a data block on disk is retrieved (read) from disk into memory and "dirtied" with new data, the data block is stored (written) to a new location on disk to thereby optimize write performance. An example of a write-anywhere file system that is configured to operate on a filer is the Write Anywhere File Layout (WAFL™) file system available from Network Appliance, Inc. of Sunnyvale, Calif. The WAFL file system is implemented within a microkernel as part of the overall protocol stack of the filer and associated disk storage. This microkernel is supplied as part of Network Appliance's Data ONTAP™ storage operating system residing on the filer.

Data is often received at the storage system from the network as packets of various lengths that are stored in lists of variable length input buffers. In contrast, file systems usually operate on data arranged in blocks of a predetermined size. For instance, data in the WAFL file system is stored in contiguous 4 kilobyte (kB) blocks. Therefore, data received by the storage system is typically converted from variable length input buffers to the fixed sized blocks for use by the file system. The process of converting data stored in input buffers to fixed sized blocks involves copying the contents of the input buffers into the system's memory, then having the file system reorganize the data into blocks of a predetermined size. However, the copy operation from the input buffers to the file system buffers consumes processor resources as that copy operation is performed in software. The present invention is directed to a technique that eliminates this copy operation into the file system buffers.

SUMMARY OF THE INVENTION

The invention relates to a technique for enhancing a write data path within a storage operating system executing on a storage system. As used herein, the write data path defines program logic used by a file system of the storage operating system to process write requests directed to data, e.g., files or virtual disks (vdisks), served by the file system. The inventive technique enhances the write data path of the storage system by providing a "zero copy" write data path embodied as a zero copy write function of the storage operating system that eliminates a copy operation for a write request received at the storage system. The eliminated operation is a data copy operation from a list of input buffers to buffers used by the file system.

In the illustrative embodiment, the storage system is a multi-protocol storage appliance having a memory for storing data and a non-volatile random access memory (NVRAM) capability that prevents data loss within the storage appliance. A portion of the memory is organized as a buffer cache having buffers used by the file system to store data associated with, e.g., write requests. When a block access (or a certain file access) write request directed to a vdisk (or file) is received at the storage appliance, a network adapter transfers write data associated with the request into selected buffers used by the file system via a direct memory access (DMA) operation. A Small Computer Systems Interconnect (SCSI) target module of the storage operating system constructs a list of these selected file system buffers for use with a write operation associated with the write request. The list of buffers is then processed by the zero copy write function of the storage operating system.

Specifically, the zero copy write function "grafts" (inserts) the selected buffers directly into a buffer tree structure of the buffer cache. The buffer tree is an internal representation of data, e.g., for a file or vdisk, stored in the buffer cache and maintained by the file system of the storage operating system. Rather than actually copying the data stored in the buffers, grafting of the file system buffers into the buffer tree entails swapping pointers that reference memory locations of buffers in the buffer tree with pointers that reference memory locations of the selected file system buffers. After the write data is grafted into the buffer tree, another DMA operation is initiated from these grafted buffers to a non-volatile log(NVlog) of the NVRAM.

Advantageously, the novel zero copy write data path technique obviates a copy operation from the input buffers into the file system buffers by allowing the network adapter to copy the write data directly from the write requests into those buffers. The invention thus eliminates the data copy operation and its consumption of processor cycles.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
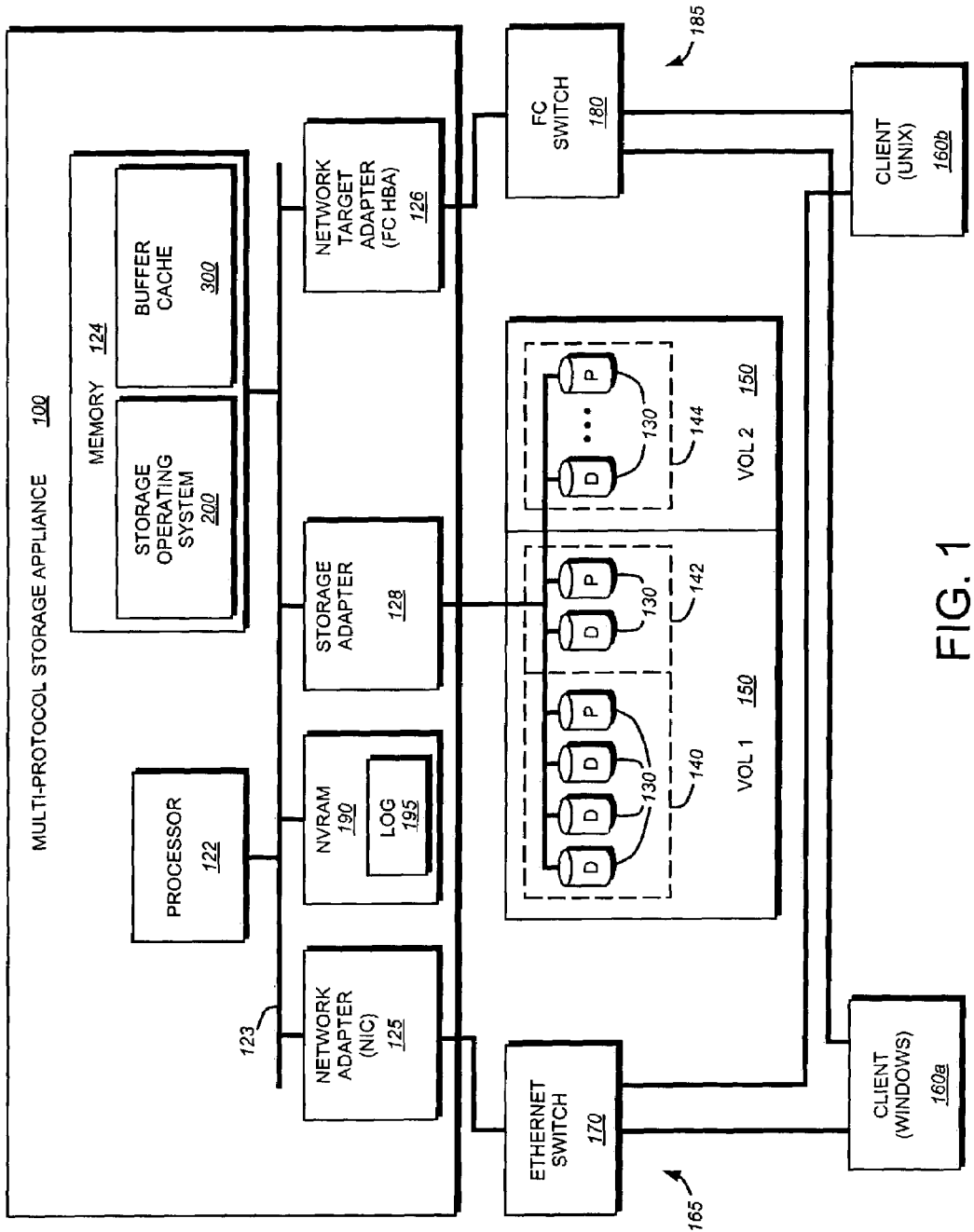
FIG. 1 is a schematic block diagram of a multi-protocol storage appliance that may be advantageously used with the present invention.

FIG. 1 is a schematic block diagram of a multi-protocol storage appliance 100 that may be advantageously used with the present invention. The multi-protocol storage appliance is configured to provide storage service for both file and block protocol access to information stored on storage devices in an integrated manner. In this context, the integrated multi-protocol appliance denotes a computer having features such as simplicity of storage service management and ease of storage reconfiguration, including reusable storage space, for users (system administrators) and clients of network attached storage (NAS) and storage area network (SAN) deployments.

The multi-protocol storage appliance 100 is illustratively embodied as a storage system comprising a processor 122, a memory 124, a plurality of network adapters 125, 126 and a storage adapter 128 interconnected by a system bus 123. The multi-protocol storage appliance 100 also includes a storage operating system 200 that provides a virtualization system (and, in particular, a file system) to logically organize the information as a hierarchical structure of named directory, file and virtual disk (vdisk) storage objects on the disks 130. An example of a multi-protocol storage appliance that may be advantageously used with the present invention is described in co-pending and commonly assigned U.S. patent application Ser. No. 10/215,917 titled A Multi-Protocol Storage Appliance that Provides Integrated Support for File and Block Access Protocols, which application is hereby incorporated by reference as though fully set forth herein.

Whereas clients of a NAS-based network environment have a storage viewpoint of files, the clients of a SAN-based network environment have a storage viewpoint of blocks or disks. To that end, the multi-protocol storage appliance 100 presents (exports) disks to SAN clients through the creation of logical unit numbers (luns) or vdisk objects. A vdisk object (hereinafter "vdisk") is a special file type that is implemented by the virtualization system and translated into an emulated disk as viewed by the SAN clients. The multi-protocol storage appliance thereafter makes these emulated disks accessible to the SAN clients through controlled exports.

In the illustrative embodiment, the memory 124 comprises storage locations that are addressable by the processor and adapters for storing software program code. A portion of the memory may be further organized as a buffer cache 300 having buffers used by the file system (hereinafter "file system buffers") to store data associated with, e.g., write requests. The processor and adapters may, in turn, comprise processing elements and/or logic circuitry configured to execute the software code and manipulate the data structures. The storage operating system 200, portions of which are typically resident in memory and executed by the processing elements, functionally organizes the storage appliance by, inter alia, invoking storage operations in support of the storage service implemented by the appliance. It will be apparent to those skilled in the art that other processing and memory means, including various computer readable media, may be used for storing and executing program instructions pertaining to the invention described herein.

The network adapter 125 couples the storage appliance to a plurality of clients 160a,b over point-to-point links, wide area networks, virtual private networks implemented over a public network (Internet) or a shared local area network, hereinafter referred to as an illustrative Ethernet network 165. For this NAS-based network environment, the clients are configured to access information stored on the multi-protocol appliance as files. Therefore, the network adapter 125 may comprise a network interface card (NIC) having the mechanical, electrical and signaling circuitry needed to connect the appliance to a network switch, such as a conventional Ethernet switch 170. The clients 160 communicate with the storage appliance over network 165 by exchanging discrete frames or packets of data according to pre-defined protocols, such as the Transmission Control Protocol/Internet Protocol (TCP/IP).

The clients 160 may be general-purpose computers configured to execute applications over a variety of operating systems, including the Solaris™/Unix® or Microsoft Windows® operating systems. Client systems generally utilize file-based access protocols when accessing information (in the form of files and directories) over a NAS-based network. Therefore, each client 160 may request the services of the storage appliance 100 by issuing file access protocol messages (in the form of packets) to the appliance over the network 165. For example, a client 160*a* running the Windows operating system may communicate with the storage appliance 100 using the Common Internet File System (CIFS) protocol over TCP/IP. On the other hand, a client 160*b* running the Solaris operating system may communicate with the multi-protocol appliance using either the Network File System (NFS) protocol over TCP/IP or the Direct Access File System (DAFS) protocol over a virtual interface (VI) transport in accordance with a remote DMA (RDMA) protocol over TCP/IP. It will be apparent to those skilled in the art that other clients running other types of operating systems may also communicate with the integrated multi-protocol storage appliance using other file access protocols.

The storage network "target" adapter 126 also couples the multi-protocol storage appliance 100 to clients 160 that may be further configured to access the stored information as blocks or disks. For this SAN-based network environment, the storage appliance is coupled to an illustrative Fibre Channel (FC) network 185. FC is a networking standard describing a suite of protocols and media that is primarily found in SAN deployments. The network target adapter 126 may comprise a FC host bus adapter (HBA) having the mechanical, electrical and signaling circuitry needed to connect the appliance 100 to a SAN network switch, such as a conventional FC switch 180. In addition to providing FC access, the FC HBA offloads fiber channel network processing operations for the storage appliance.

The clients 160 generally utilize block-based access protocols, such as the Small Computer Systems Interface (SCSI) protocol, when accessing information (in the form of blocks, disks or vdisks) over a SAN-based network. SCSI is a peripheral input/output (I/O) interface with a standard, device independent protocol that allows different peripheral devices, such as disks 130, to attach to the storage appliance 100. In SCSI terminology, clients 160 operating in a SAN environment are initiators that initiate requests and commands for data. The multi-protocol storage appliance is thus a target configured to respond to the requests issued by the initiators in accordance with a request/response protocol. The initiators and targets have endpoint addresses that, in accordance with the FC protocol, comprise worldwide names (WWN). A WWN is a unique identifier, e.g., a node name or a port name, consisting of an 8-byte number.

The multi-protocol storage appliance 100 supports various SCSI-based protocols used in SAN deployments, including SCSI encapsulated over TCP (iSCSI) and SCSI encapsulated over FC (FCP). The initiators (hereinafter clients 160) may thus request the services of the target (hereinafter storage appliance 100) by issuing iSCSI and FCP messages over the network 165, 185 to block protocol (e.g., iSCSI and FCP) interconnect adapters 125, 126 to thereby access information stored on the disks. It will be apparent to those skilled in the art that the clients may also request the services of the integrated multi-protocol storage appliance using other block access protocols. By supporting a plurality of block access protocols, the multi-protocol storage appliance provides a unified and coherent access solution to vdisks/luns in a heterogeneous SAN environment.

The storage adapter 128 cooperates with the storage operating system 200 executing on the storage appliance to access information requested by the clients. The information may be stored on the disks 130 or other similar media adapted to store information. The storage adapter includes I/O interface circuitry that couples to the disks over an I/O interconnect arrangement, such as a conventional high-performance, FC serial link topology. The information is retrieved by the storage adapter and, if necessary, processed by the processor 122 (or the adapter 128 itself) prior to being forwarded over the system bus 123 to the network adapters 125, 126, where the information is formatted into packets or messages and returned to the clients.

Storage of information on the appliance 100 is preferably implemented as one or more storage volumes (e.g., VOL1-2 150) that comprise a cluster of physical storage disks 130, defining an overall logical arrangement of disk space. The disks within a volume are typically organized as one or more groups of Redundant Array of Independent, (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails.

Specifically, each volume 150 is constructed from an array of physical disks 130 that are organized as RAID groups 140, 142, and 144. The physical disks of each RAID group include those disks configured to store striped data (D) and those configured to store parity (P) for the data, in accordance with an illustrative RAID 4 level configuration. However, other RAID level configurations (e.g. RAID 5) are also contemplated. In the illustrative embodiment, a minimum of one parity disk and one data disk may be employed. However, a typical implementation may include three data and one parity disk per RAID group and at least one RAID group per volume.

The storage appliance 100 also includes a non-volatile random access memory (NVRAM 190) that provides fault-tolerant backup of data, enabling the integrity of requests received at the storage appliance to survive a service interruption based upon a power failure or other fault. That is, the exemplary storage appliance may be made more reliable and stable in the event of a system shutdown or other unforeseen problem by employing a backup memory consisting of NVRAM 190. Data associated with every write request received at the storage appliance is stored in the NVRAM to protect against data loss in the event of a sudden crash or failure of the storage appliance. These write requests may apply to either NAS or SAN based client requests.

Illustratively, the NVRAM 190 is a large-volume, solid-state memory array having either a back-up battery or other built-in, last-state-retention capabilities (e.g. a FLASH memory) that hold a last state of the memory in the event of any power loss to the array. The size of the NVRAM is variable; it is typically sized sufficiently to log a certain time-based chunk of transactions/requests (for example, several seconds worth) in accordance with an NVlog capability 195. The NVRAM 190 is filled in parallel with the buffer cache 300 after each client request is completed, but before the result of the request is returned to the requesting client.

To facilitate access to the disks 130, the storage operating system 200 implements a write-anywhere file system that cooperates with virtualization modules to provide a function that "virtualizes" the storage space provided by disks 130. The file system logically organizes the information as a hierarchical structure of named directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization system allows the file system to further logically organize information as a hierarchical structure of named vdisks on the disks, thereby providing an integrated NAS and SAN appliance approach to storage by enabling file-based (NAS) access to the files and directories, while further enabling block-based (SAN) access to the vdisks on a file-based storage platform.

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system, including a write in-place file system, may be enhanced for use in accordance with the inventive principles described herein. As such, where the term "WAFL" is employed, it should be taken broadly to refer to any storage operating system that is otherwise adaptable to the teachings of this invention.

As used herein, the term "storage operating system" generally refers to the computer-executable code operable on a computer that manages data access and may, in the case of a multi-protocol storage appliance, implement data access semantics, such as the Data ONTAP storage operating system, which is implemented as a microkernel. The storage operating system can also be implemented as an application program operating over a general-purpose operating system, such as the Solaris or Windows operating system, or as a general-purpose operating system with configurable functionality, which is configured for storage applications as described herein.

In addition, it will be understood to those skilled in the art that the inventive technique described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 2:
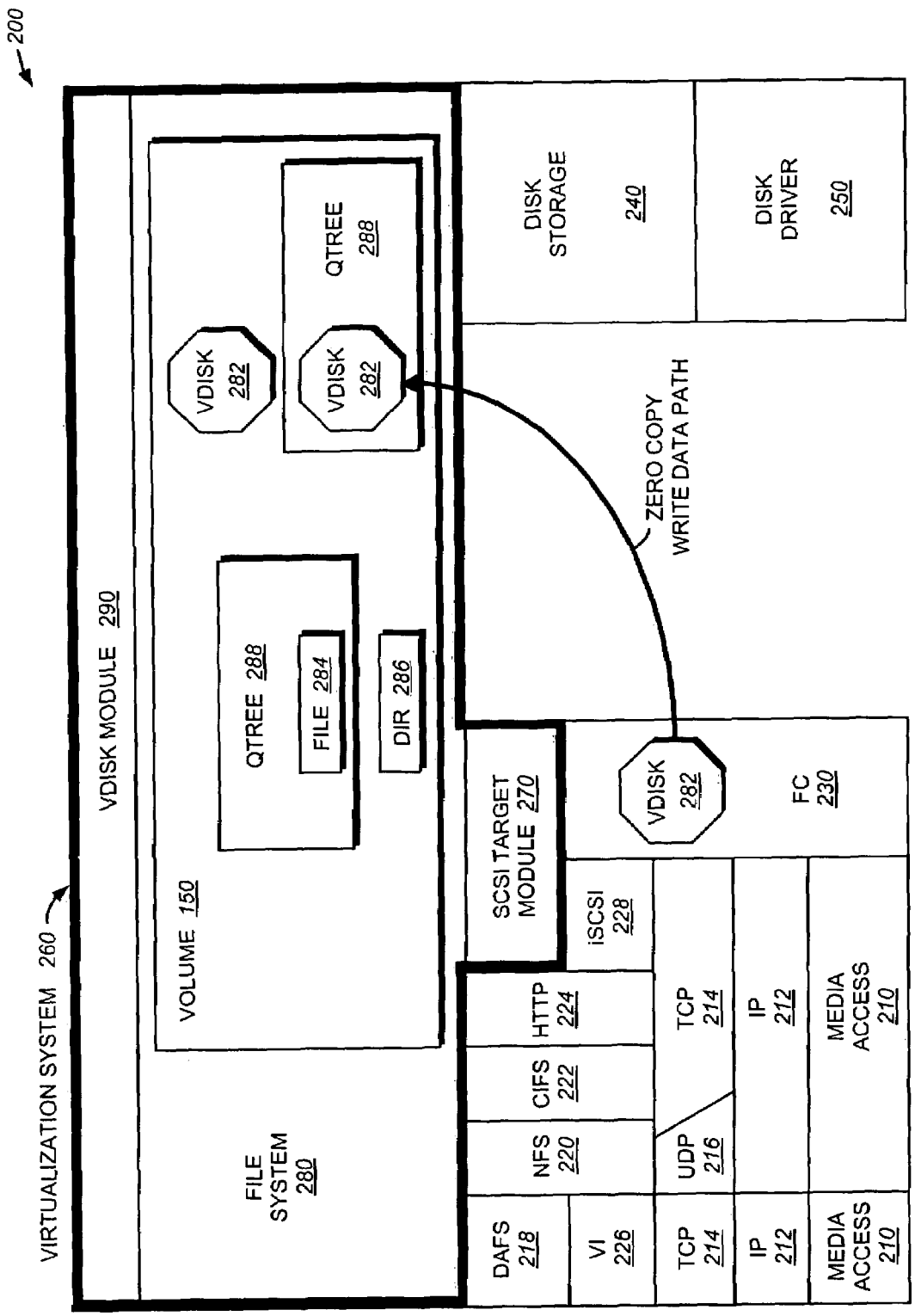
FIG. 2 is a schematic block diagram of a storage operating system of the multi-protocol storage appliance that may be advantageously used with the present invention.

FIG. 2 is a schematic block diagram of the storage operating system 200 that may be advantageously used with the present invention. The storage operating system comprises a series of software layers organized to form an integrated network protocol stack or, more generally, a multi-protocol engine that provides data paths for clients to access information stored on the multi-protocol storage appliance using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the DAFS protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as RDMA, as required by the DAFS protocol 218.

An iSCSI driver layer 228 provides block protocol access over the TCP/IP network protocol layers, while a FC driver layer 230 operates with the FC HBA 126 to receive and transmit block access requests and responses to and from the integrated storage appliance. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the multi-protocol storage appliance. In addition, the storage operating system includes a disk storage layer 240 that implements a disk storage protocol, such as a RAID protocol, and a disk driver layer 250 that implements a disk access protocol such as, e.g., a SCSI protocol.

Bridging the disk software layers with the integrated network protocol stack layers is a virtualization system 260 that is implemented by a file system 280 interacting with virtualization modules illustratively embodied as, e.g., vdisk module 290 and SCSI target module 270. It should be noted that the vdisk module 290, the file system 280 and SCSI target module 270 can be implemented in software, hardware, firmware, or a combination thereof. The vdisk module 290 is layered on the file system 280 to enable access by administrative interfaces, such as a streamlined user interface, in response to a system administrator issuing commands to the multi-protocol storage appliance 100. In essence, the vdisk module 290 manages SAN deployments by, among other things, implementing a comprehensive set of vdisk (lun) commands issued through the user interface by a system administrator. These vdisk commands are converted to primitive file system operations ("primitives") that interact with the file system 280 and the SCSI target module 270 to implement the vdisks.

The SCSI target module 270, in turn, initiates emulation of a disk or lun by providing a mapping procedure that translates luns into the special vdisk file types. The SCSI target module is illustratively disposed between the FC and iSCSI drivers 228, 230 and the file system 280 to thereby provide a translation layer of the virtualization system 260 between the SAN block (lun) space and the file system space, where luns are represented as vdisks 282. To that end, the SCSI target module has a set of application programming interfaces (APIs) that are based on the SCSI protocol and that enable a consistent interface to both the iSCSI and FCP drivers 228, 230. By "disposing" SAN virtualization over the file system 280, the multi-protocol storage appliance reverses the approaches taken by prior systems to thereby provide a single unified storage platform for essentially all storage access protocols.

The file system 280 is illustratively a message-based system; as such, the SCSI target module 270 transposes a SCSI request into one or more messages representing an operation(s) directed to the file system. For example, a message generated by the SCSI target module may include a type of operation (e.g., read, write) along with a pathname (e.g., a path descriptor) and a filename (e.g., a special filename) of the vdisk object represented in the file system. Alternatively, the generated message may include an operation type and file handle containing volume/inode information. The SCSI target module 270 passes the message into the file system layer 280 as, e.g., a function call, where the operation is performed.

The file system provides volume management capabilities for use in block-based access to the information stored on the storage devices, such as disks. That is, in addition to providing file system semantics, such as naming of storage objects, the file system 280 provides functions normally associated with a volume manager. These functions include (i) aggregation of the disks, (ii) aggregation of storage bandwidth of the disks, and (iii) reliability guarantees, such as mirroring and/or parity (RAID), to thereby present one or more storage objects layered on the file system. A feature of the multi-protocol storage appliance is the simplicity of use associated with these volume management capabilities, particularly when used in SAN deployments.

The file system 280 illustratively implements the WAFL file system having an on-disk format representation that is block-based using, e.g., 4 kilobyte (kB) blocks and using inodes to describe the files. The WAFL file system uses files to store metadata describing the layout of its file system; these metadata files include, among others, an inode file. A file handle, i.e., an identifier that includes an inode number, is used to retrieve an inode from disk. A description of the structure of the file system, including on-disk inodes and the inode file, is provided in U.S. Pat. No. 5,819,292, titled Method for Maintaining Consistent States of a File System and for Creating User-Accessible Read-Only Copies of a File System by David Hitz et al., issued Oct. 6, 1998, which patent is hereby incorporated by reference as though fully set forth herein.

As noted, a vdisk is a special file type in a volume that derives from a plain (regular) file, but that has associated export controls and operation restrictions that support emulation of a disk. More specifically, the vdisk 282 is a multi-inode object comprising a special file inode and at least one associated stream inode that are managed as a single, encapsulated storage object within the file system 280. The vdisk 282 illustratively manifests as an embodiment of the stream inode that, in cooperation with the special file inode, creates a new type of file storage object having the capacity to encapsulate specific security, management and addressing (export) information. An example of a vdisk that may be advantageously used with the present invention is described in U.S. patent application Ser. No. 10/216,453 titled Storage Virtualization by Layering Virtual Disk Objects on a File System, which application is hereby incorporated by reference as though fully set forth herein.

The file system implements access operations to vdisks 282, as well as to files 284 and directories (dir 286) that coexist with respect to global space management of units of storage, such as volumes 150 and/or qtrees 288. A qtree 288 is a special directory that has the properties of a logical sub-volume within the namespace of a physical volume. Each file system storage object (file, directory or vdisk) is illustratively associated with one qtree, and quotas, security properties and other items can be assigned on a per-qtree basis. The vdisks and files/directories may be layered on top of qtrees 288 that, in turn, are layered on top of volumes 150 as abstracted by the file system "virtualization" layer 280.

The vdisk storage objects in the file system 280 are generally associated with SAN deployments of the multi-protocol storage appliance, whereas the file and directory storage objects are associated with NAS deployments of the appliance. The files and directories are generally not accessible via the FC or SCSI block access protocols; however, a file can be converted to a vdisk and then accessed by either the SAN or NAS protocol. The vdisks are thus accessible as luns from the SAN (FC and SCSI) protocols and as files by the NAS (NFS and CIFS) protocols.

In general, data associated with write requests issued by clients 160 in accordance with file access protocols and directed to files served by the file system 280 may be received at the storage appliance as packets of various lengths. These packets are generally stored in lists of variable length input buffers. However, file systems typically operate on data arranged in blocks of a predetermined size. For instance, data in the WAFL file system is stored in contiguous 4 kilobyte (kB) blocks. The file data received by the storage appliance is thus converted from variable length input buffers to the fixed sized blocks for use by the file system 280. This conversion is accomplished by copying data in the input buffers into the fixed size file system buffers within the buffer cache 300.

For example, when a NFS or CIFS write request (and associated write data) is received from a client 160 at the storage appliance 100, a single-source multiple-destination copy operation is performed on the write data within file system protocol layers of the storage operating system 200. That is, the data contained in a write request embodied as a NFS or CIFS request is initially stored in a collection of input buffers when the data is received at the system. The appropriate file access protocol then copies that write data into file system buffers of the buffer cache 300 and into the NVRAM 190. However, the copy operation from the input buffers to the file system buffers consumes processor resources as that copy operation is performed in software.

According to the invention, a technique is provided for enhancing a write data path within the storage operating system executing on the multi-protocol storage appliance. As used herein, the write data path defines program logic used by the file system of the storage operating system to process write requests directed to files or vdisks served by the file system. The program logic can be implemented in software, hardware, firmware, or a combination thereof. The inventive technique provides a "zero copy" write data path in the file system that eliminates data copy operations for write requests associated with a block access request (or a certain file access request, such as a DAFS request) received at the storage appliance. The data copy operations eliminated by the novel technique are illustratively copy operations from input buffers to file system buffers of a buffer tree within the buffer cache. The inventive technique thus enhances the write data path of the storage appliance by providing a zero copy write data path embodied as a zero copy write function of the storage operating system that eliminates a copy operation for a write request received at the storage appliance.

Figure 3:
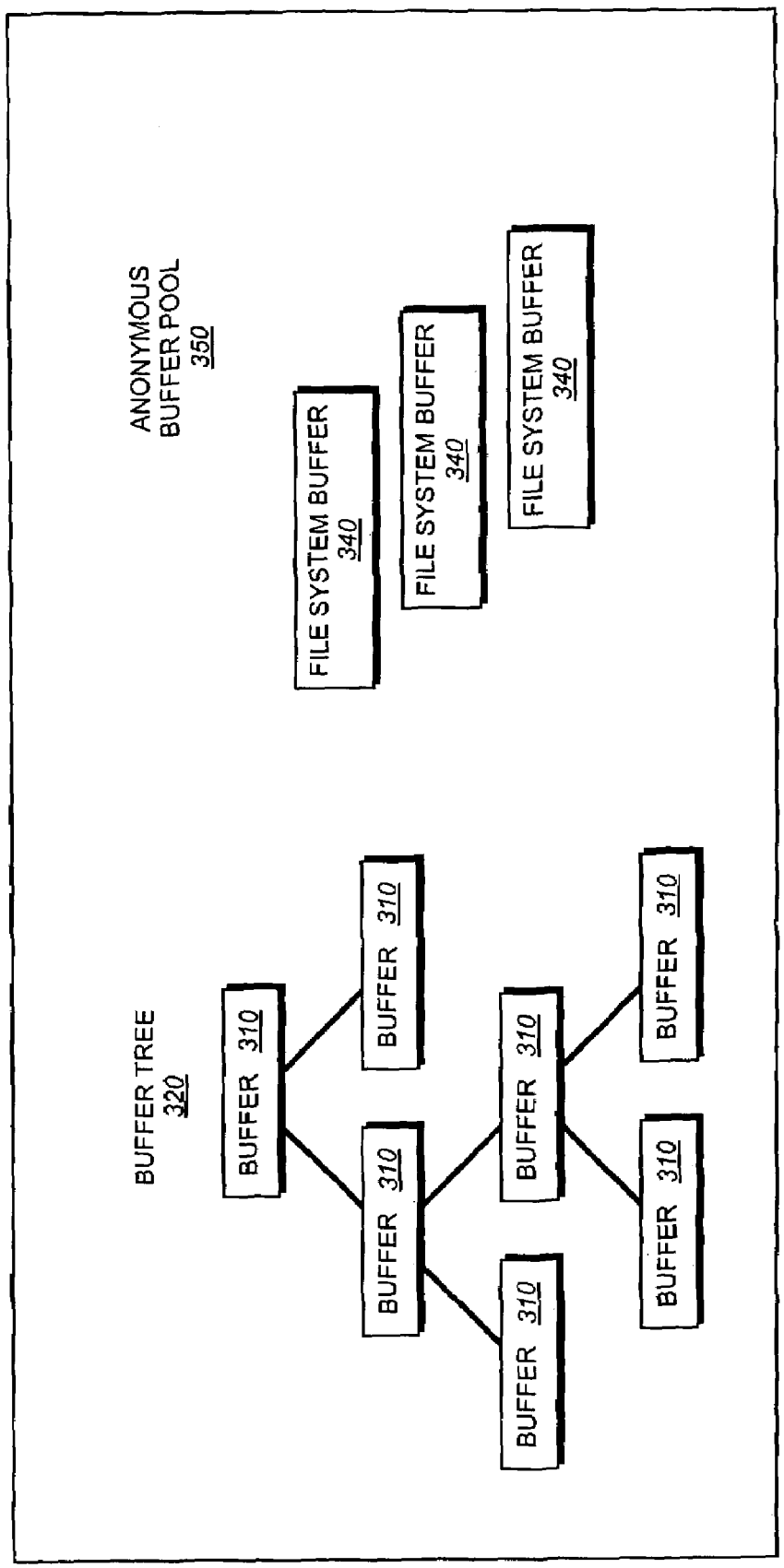
FIG. 3 is a schematic block diagram of a buffer cache that may be advantageously used with the present invention.

FIG. 3 is a schematic block diagram of the buffer cache 300 that may be advantageously used with the present invention. As noted, a portion of the memory 124 is organized as buffer cache 300 for storing data associated with requests issued by initiators and/or clients of the storage appliance. The buffer cache, in turn, comprises a plurality of storage locations or buffers 310 organized as a buffer tree structure 320. The buffer tree 320 is an internal representation of data (in buffers 310) stored in the buffer cache and maintained by the storage operating system. More specifically, in the illustrative embodiment, the buffer tree structure is an internal representation of loaded blocks (both dirty and not dirty) of data for, e.g., a file 284 or vdisk 282 in the buffer cache 300 and maintained by the file system of the storage operating system.

The buffer cache 300 also comprises a plurality of buffers 340 that are organized as a pool 350 of "anonymous" buffers available for use by the file system 280. These anonymous file system buffers 340 are not assigned to a file 284 or vdisk 282 associated with, e.g., a write request received at the storage appliance. Therefore, this pool of "free" (unassigned) file system buffers 340 may be acquired, as needed, by entities, such as the SCSI target module 270 to store data associated with block access or certain file access write requests directed to the file system 280.

The SCSI protocol, which forms the basis of several block access protocols, typically transports data as blocks without protocol headers. As a result, block protocol interconnect adapters, e.g., as used with FCP or iSCSI, can allow a storage operating system to control placement of write data into input buffers. In addition, certain file access protocols, such as the DAFS protocol, can exploit network adapters with direct data placement capabilities. Therefore, write data received using protocols and adapters with sufficient data placement controls and directed to vdisks or files served by the file system can be stored directly in the file system buffers 340 of the buffer cache 300, and can thus allow use of the novel zero copy write technique.

In contrast, write requests received using protocols or adapters that lack sufficient data placement controls are typically received at the network protocol layers of the storage appliance and their data is loaded into input buffers. The input buffers are typically fragmented and thus do not allow efficient conversion into 4k WAFL file system buffers used in the buffer trees. Therefore, conventional NAS-based protocols, such as NFS or CIFS, may not be used in accordance with the novel zero copy write data path technique.

Figure 4:
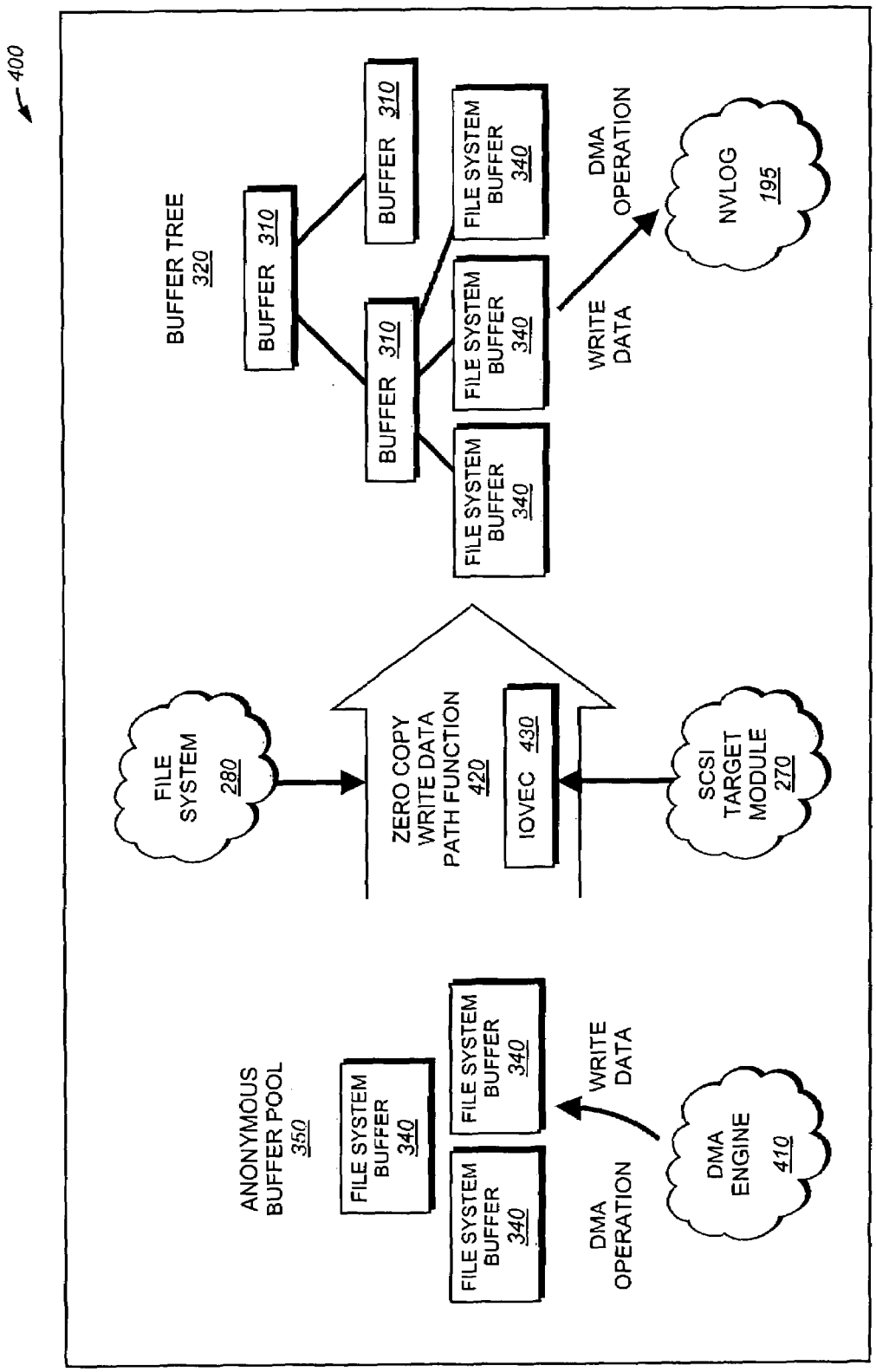
FIG. 4 is a functional block diagram of the interaction among various entities and data structures in accordance with a zero copy write data path technique of the present invention.

FIG. 4 is a functional block diagram of the interaction 400 among various entities and data structures in accordance with the zero copy write data path technique of the present invention. Assume a block access or a certain file access write request is issued by a client 160 (initiator) and received at a network adapter, such as network adapter 126, of the storage appliance. Direct memory access (DMA) logic or "engines" 410 of the adapter transfers (via a DMA operation) write data associated with the request into selected file system buffers 340 acquired by the SCSI target module 270 from the anonymous buffer pool 350. The SCSI target module 270 constructs a list of these selected file system buffers for use with a write operation associated with the write request. The SCSI target module then passes that list of buffers into the file system 280 as a zero copy write function call of the storage operating system.

Specifically, the SCSI target module 270 constructs an input/output vector (iovec 430) using pointers to the acquired file system buffer addresses and headers associated with those buffers. The iovec 430 is thus essentially a list of file system buffers 340 that is comprise a write operation associated with the write request issued by the initiator. The SCSI target module 270 passes the iovec 430 to the file system 280 as the zero copy write function 420, where an operation is performed to "graft" (insert) the selected buffers 340 directly into buffer tree 320. Rather than actually copying the data stored in the selected buffers, the zero copy write function 420 uses the iovec to graft the file system buffers into the buffer tree by swapping pointers that reference memory locations of buffers in the buffer tree with pointers that reference memory locations of the selected file system buffers. After the write data is grafted into the buffer tree, a DMA operation is initiated to transfer the write data from these grafted buffers to the NVlog 195.

Figure 5:
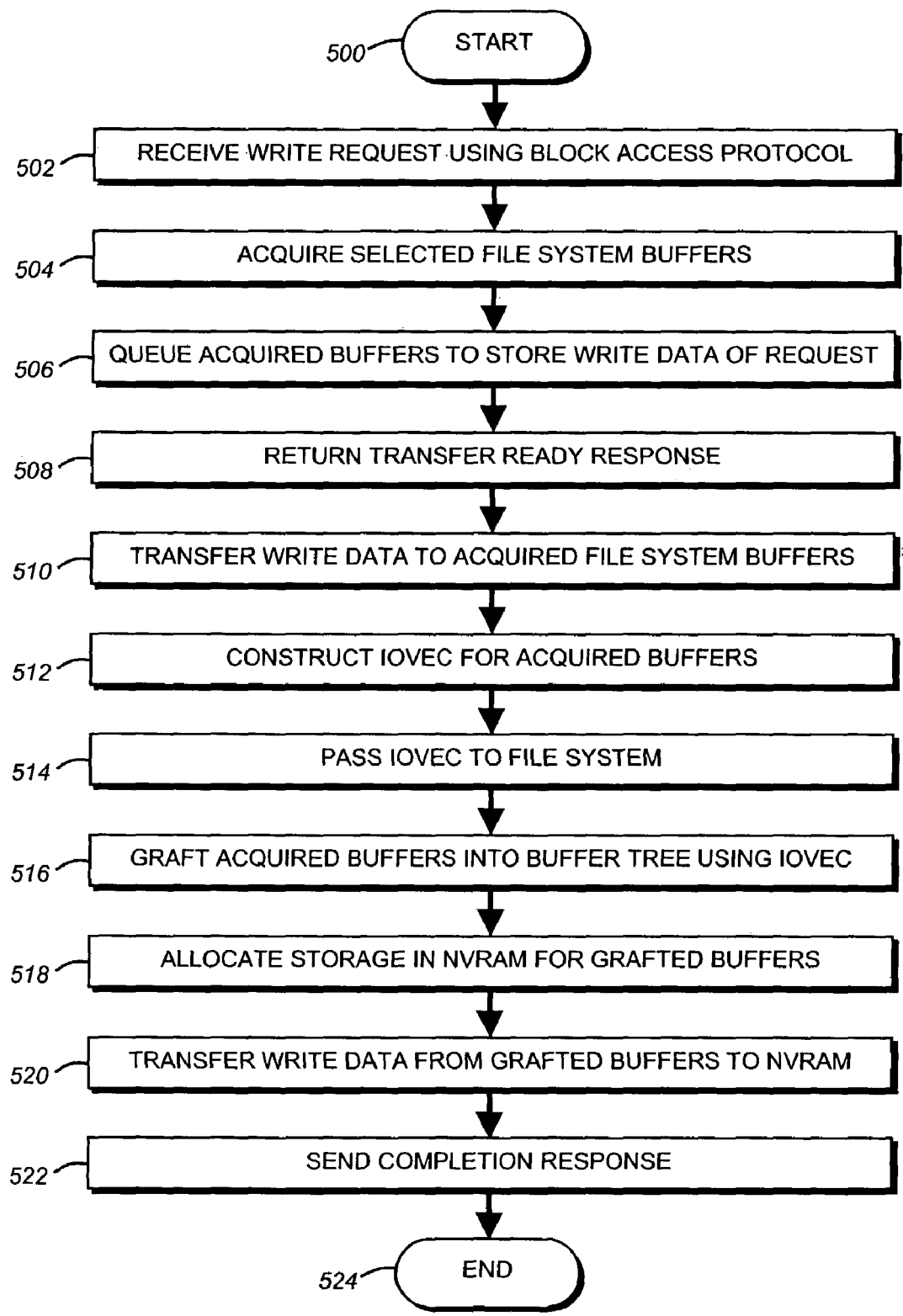
FIG. 5 is a flowchart illustrating a sequence of steps comprising the zero copy write data path technique of the present invention.

FIG. 5 is a flowchart illustrating the sequence of steps comprising the zero copy write data path technique of the present invention. The sequence starts at Step 500 and proceeds to Step 502 where a write request issued by a SAN initiator using a block access protocol, such as FCP, is received at the storage appliance. The write request is illustratively a solicited write request comprising a write operation having associated write data that is "clocked" by the target, e.g., the storage appliance 100. Upon receiving the write request, the SCSI target module 270 of the storage appliance acquires selected anonymous file system buffers 340 needed to satisfy the write request (Step 504). In Step 506, the SCSI target module cooperates with the network adapter driver, such as FCP driver 230, to "queue" those acquired file system buffers for storing the data associated with the write request. The target/driver 230 then returns a transfer ready (XFR_RDY) response to the initiator in Step 508. The XFR_RDY response comprises an offset (address) and a length value that indicates to the initiator the amount of data (and its location) that the initiator can send to the target in accordance with the write request.

Upon receiving the XFR_RDY response, the initiator transmits data associated with the write request to one or more addresses of those buffers specified by the offset within the response and equal to an amount specified by the length value in that response (Step 510). Specifically, the initiator transfers the data associated with the write request to the adapter 126, where the DMA engine 410 and FCP driver 230 transfer the data of a particular length to a particular offset (buffer address) in the buffer cache 300 of memory 124 in accordance with a DMA operation. More specifically, the SCSI target module 270 passes the addresses of the file system buffers 340 in buffer cache 300 to the FCP driver 230, which then passes those addresses to the DMA engine (firmware) on the network adapter 126. The DMA engine logic 410 uses those addresses to transfer the write data (when it arrives from the initiator) directly into the acquired file system buffers 340 in accordance with a DMA operation. Notably, the DMA engine cooperates with the driver to transfer the data into the appropriate buffers without intervention of the processor 122 of the storage appliance 100.

Once the DMA logic has transferred the write data into the appropriate buffers, the driver 230 notifies the SCSI target module 270 that the write data has arrived and is stored in the acquired file system buffers at the specified addresses/offset. In Step 512, the SCSI target module constructs the iovec 430 using pointers to the acquired file system buffer addresses and headers associated with those buffers. The SCSI target module 270 then passes the iovec 430 to the file system 280 (Step 514) where, at Step 516, the zero copy write function 420 is invoked to "graft" (insert) the acquired list of buffers associated with the iovec directly into buffer tree 320 of the buffer cache 300. Since the acquired file system buffers 340 are anonymous buffers, they are not assigned within the buffer tree 320 to a particular file 284 or vdisk 282. Therefore, the file system 280 inserts the list of buffers identified by the iovec 430 directly into the buffer tree 320 for the particular file or vdisk. By directly inserting the list of file system buffers 340 into the buffer tree at the appropriate locations, no copy operations are required.

After the file system buffers are grafted into the buffer tree of buffer cache 300, storage locations in the NVRAM 190 are allocated for these buffers (Step 518) and a DMA operation is initiated to transfer the write data from those buffers into the NVRAM (Step 520). That is, after the file system buffers are grafted into the buffer tree 320, the DMA operation is initiated to the NVlog 195 using the buffers 340 as the source of the data transfer. The NVlog capabilities interact with the DMA operation to transfer the write data stored in the file system buffers to the NVRAM 190 without the use of processor-intensive copy operations. In particular, the file system calls a driver in the NVRAM to initiate the DMA operation by providing DMA descriptors (address and length information) to the NVRAM driver. Upon completion of the DMA operation, the NVRAM driver notifies the file system of completion. The file system then sends a "callback" to the SCSI target module 270 instructing it (Step 522) to send a completion response to the initiator. The sequence then ends at Step 524.

Transfer of write data to the NVlog 195 in accordance with a DMA operation essentially creates a zero-copy write operation. Zero-copy write operations require different treatment than write operations over network-based file system protocols, like NFS or CIFS. For NFS and CIFS, the write data (the source of the DMA transfers) resides in input buffers; therefore, while the DMA operation is scheduled (or in progress), this write data cannot change. For zero-copy write operations, however, the data that is transferred in accordance with the DMA operation resides in the buffer tree. This creates a potential problem with respect to overwrite operations to the data ("pages") scheduled for DMA transfer to the NVlog. These pages cannot be modified until the DMA operation completes.

In other words during the DMA operation, the buffers from which the operation is initiated must be protected against overwriting. As noted, DMA engines on the network adapter are programmed (initialized) to transfer the write data into the file system buffers acquired by the SCSI target module and having correct addresses to enable them to be efficiently (and easily) grafted into the buffer tree for the particular file or vdisk. The data stored in the grafted buffers is then transferred to the NVRAM in accordance with a DMA operation initiated by the file system. When the DMA operation from the buffer tree to the NVlog 195 is in progress, a subsequent write operation directed to those grafted buffers should not overwrite (destroy) the data stored in those buffers. Rather, the subsequent write operation directed to those grafted buffers generates a copy-on-write (COW) operation within the file system.

Note that there are actually two DMA operations involved in connection with the zero-copy write data path technique. The first DMA operation involves transfer of data associated with a write request from the network adapter into the file system buffers acquired by the SCSI target module from a pool of free or anonymous buffers. As noted, since the buffers acquired by the SCSI target module are anonymous, they are not assigned to any file or vdisk. Once acquired, those free buffers "belong" to the SCSI target module; it is thus impossible that a subsequent write operation may overwrite the data contents of those buffers during this first DMA operation.

The second DMA operation involves the write data stored in the acquired buffers that is transferred into the NVRAM as initiated by the file system. These acquired buffers have been grafted in the buffer tree and are thus now assigned to a file or vdisk. While this second DMA operation is in progress, the contents of the grafted buffers must be protected against subsequent write operations issued by initiators or clients to the particular file or vdisk, as these write operations may overwrite the data stored in those grafted buffers. The contents of the grafted buffers may be protected by either "holding off" subsequent write operations directed to those buffers or allowing the write operations to complete using the COW operation.

Specifically, when the zero copy write operation is in progress, the buffers 340 are "locked" and the DMA operation to the NVlog 195 is scheduled. A COW operation is performed on each locked file system buffer 340 that is the target of a subsequent write operation and that is the same buffer involved in the DMA operation to the NVlog. The COW operation creates another file system buffer to accommodate the subsequent write operation, while the original file system buffer continues to be used for the DMA operation to the NVlog. More specifically, the COW operation involves creating a copy of a buffer that is involved with the DMA operation and directing a subsequent write operation to that created copy. The originally acquired file system buffer is then immediately detached from the buffer tree for that particular file or vdisk and returned to the free buffer pool 350. The created copy of the acquired buffer is then grafted into the buffer tree to replace the originally acquired buffer.

Advantageously, the novel zero copy write data path technique obviates a copy operation from the input buffers into the file system buffers by allowing the network adapter to copy the write data directly from the write requests into those buffers. The invention thus eliminates the data copy operation and its consumption of processor cycles.

While there has been shown and described an illustrative embodiment for enhancing a write data path within a file system of a storage operating system executing on a storage system, it is to be understood that various other adaptations and modifications may be made within the spirit and scope of the invention. For example, zero copy write operations may be implemented for large unaligned (non-4k alignment) write operations. As noted, a SCSI target, such as the multi-protocol storage appliance 100, initiates write operations from a SCSI initiator using transfer ready (XFR_RDY) messages. At the time the appliance sends the XFR_RDY message, it allocates buffers to hold the write data that is expected. When sending a XFR_RDY message soliciting a large write operation starting at a non-4k offset, the storage appliance indexes into a first queued buffer at a particular offset (to hold the write data) and that data is then transferred in accordance with a DMA operation starting at the offset. This enables performance of an entire zero-copy write operation, except for "runts" at the front and back of a large transfer that need to be copied.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A system configured to enhance a write data path within a file system of a storage operating system executing on a storage system, the system comprising:

a buffer cache including file system buffers used by the file system to store data associated with a write request directed to a file served by the file system, the buffer cache further including a buffer tree representing data for the file;

a network adapter configured to transfer write data associated with the write request into selected file system buffers of the buffer cache;

a zero copy write function of the storage operating system configured to insert the selected file system buffers directly into the buffer tree to thereby eliminate a copy operation for the write request; and a non-volatile random access memory (NVRAM) capability that prevents data loss within the storage system, the NVRAM having an NVlog adapted to log the write request, wherein the write data stored in the selected file system buffers inserted into the buffer tree is transferred to the NVlog via a direct memory access operation.

2. The system of claim 1 further comprising a list of the selected file system buffers constructed by a target module of the storage operating system, the list of selected file system buffers processed by the zero copy write function to insert the selected file system buffers into the buffer tree.

3. The system of claim 2 wherein the list of selected file system buffers is an input/output vector (iovec) and wherein the iovec is constructed using pointers to addresses of the selected file system buffers and headers associated with the buffers.

4. The system of claim 2 wherein the target module is a small computer systems interface target module.

5. The system of claim 1 wherein the storage system is a multi-protocol storage appliance having a memory and wherein a portion of the memory is organized as the buffer cache.

6. The system of claim 1 wherein the network adapter transfers write data associated with the write request into selected file system buffers via a direct memory access operation.

7. The system of claim 1 wherein the file is a multi-inode object comprising a special file inode and at least one associated stream inode that are managed as a single, encapsulated storage object within the file system.

8. The system of claim 1, further comprising:
a virtual disk is supported by the file.

9. A method for enhancing a write data path within a file system of a storage operating system executing on a storage system, comprising:

organizing a portion of a memory in the storage system as a buffer cache having file system buffers used by the file system to store data associated with a write request directed to a file served by the file system, the buffer cache further including a buffer tree representing data for the file;

constructing a list of the selected file system buffers, wherein the list of selected file system buffers is an input/output vector (iovec);

constructing the iovec using pointers to addresses of the selected file system buffers and headers associated with the buffers;

processing the list of selected file system buffers to insert the selected file system buffers into the buffer tree;

transferring write data associated with the write request into selected file system buffers of the buffer cache; and inserting the selected file system buffers directly into the buffer tree using a zero copy write function of the storage operating system to thereby eliminate a copy operation for the write request, using the iovec to swap pointers that reference memory locations of the buffers in the buffer tree with pointers that reference memory locations of the selected file system buffers.

10. The method of claim 9, further comprising:
supporting a virtual disk by the file.

11. The method of claim 9 further comprising transferring the write data stored in the selected file system buffers inserted into the buffer tree to a non-volatile log via a direct memory access operation.

12. A system configured to enhance a write data within a storage system executing a storage system, the system comprising:

a buffer cache including a set of buffers used by the storage operating system to store data associated with a write request, the buffer cache further including a buffer structure representing data for storage by the storage system;

a network adapter configured to transfer write data associated with the write request into selected buffers of the buffer cache; and a function of the storage operating system configured to insert the selected buffers directly into the buffer structure using an input/output vector to swap pointers that reference memory locations of the buffers in the buffer structure with pointers that reference memory locations of the selected buffers to thereby eliminate a copy operation from the write data path for the write request.

13. The system of claim 12, further comprising:
a virtual disk is supported by the file.

14. The system of claim 12 wherein the function is a zero copy write function of the storage operating system.

15. The system of claim 12 wherein the set of buffers is a set of file system buffers used by a file system of the storage operating system to store data associated with a write request directed to a file served by the file system.

16. The system of claim 15 wherein the buffer structure is a buffer tree representing data for the file served by the file system.

17. An apparatus for enhancing a write data path within a file system of a storage operating system executing on a storage system, the apparatus comprising:

means for organizing a portion of a memory in the storage system as a buffer cache having file system buffers used by the file system to store data associated with a write request directed to a file served by the file system, the buffer cache further including a buffer tree representing data for the file;

means for constructing a list of selected file system buffers wherein the list of selected file system buffers is an input/output vector (iovec);

means for constructing the iovec using pointers to addresses of the selected file system buffers and headers associated with the buffers;

means for processing the list of selected the list of selected file system buffers to insert the selected file system buffers into the buffer tree;

means for transferring write data associated with the write request into selected file system buffers of the buffer cache; and means for inserting the selected file system buffers directly into the buffer tree using a zero copy write function of the storage operating system to thereby eliminate a copy operation for the write request using a means for swapping pointers that reference memory locations of the buffers tree with pointers that reference memory locations of the selected file system buffers.

18. The apparatus of claim 17, further comprising:
a virtual disk is supported by the file.

19. A computer readable medium containing executable program instructions for enhancing a write data path within a file system of a storage operating system executing on a storage system, the executable program instructions comprising program instructions for:
- organizing a portion of a memory in the storage system as a buffer cache having file system buffers used by the file system to store data associated with a write request directed to a file served by the file system, the buffer cache further including a buffer tree representing data for the file;
- constructing a list of the selected file system buffers wherein the list of selected file system buffers is an input/output vector (iovec);
- constructing the iovec using pointers to addresses of the selected file system buffers and headers associated with the buffers;
- processing the list of selected file system buffers to insert the selected file system buffers into the buffer tree;
- transferring write data associated with the write request into selected file system buffers of the buffer cache; and
- inserting the selected file system buffers directly into the buffer tree using a zero copy write function of the storage operating system to thereby eliminate a copy operation for the write request by swapping pointers that reference memory locations of the buffers in the buffer tree with pointers that reference memory locations of the selected file system buffers.

20. A method for handling data received by a data storage system, comprising:
- writing data associated with a write request into a memory, the memory divided into a plurality of file system buffers using a first set of pointers;
- inserting the data written into the memory directly into a buffer tree using a second set of pointers, a buffer of the buffer tree dividing the data written into memory into blocks to be written to disk storage;
- using input/output vectors to swap the first set of pointers and the second set of pointers.

21. The method of claim 20, further comprising:
supporting a virtual disk by the buffer tree.

22. A method for handling data received by a data storage system, comprising:
- writing data associated with a write request into a memory, the memory divided into a plurality of file system buffers using a first set of pointers;
- inserting the data written into the memory directly into a buffer tree using a second set of pointers, a buffer of the buffer tree dividing the data written into memory into blocks to be written to disk storage; and
- transferring the data written to memory to a non-volatile log.

23. An apparatus for handling data received by a data storage system, comprising:
- means for writing data associated with a write request into a memory, the memory divided into a plurality of file system buffers using a first set of pointers;
- means for inserting the data written into the memory directly into a buffer tree using a second set of pointers, a buffer of the buffer tree dividing the data written into memory into blocks to be written to disk storage; and
- means for using input/output vectors to swap the first set of pointers and the second set of pointers.

24. The apparatus of claim 23, further comprising:
means for supporting a virtual disk by the buffer tree.

25. An apparatus for handling data received by a data storage system, comprising:
- means for writing data associated with a write request into a memory, the memory divided into a plurality of file system buffers using a first set of pointers; and
- means for inserting the data written into the memory directly into a buffer tree using a second set of pointers, a buffer of the buffer tree dividing the data written into memory into blocks to be written to disk storage
- means for transferring the data written to memory to a non-volatile log.

26. A computer readable media, comprising:
said computer readable media containing instructions for execution on a processor for the practice of a method of handling data received by a data storage system, the method having the steps of,
- writing data associated with a write request into a memory, the memory divided into a plurality of file system buffers using a first set of pointers;
- inserting the data written into the memory directly into a buffer tree using a second set of pointers, a buffer of the buffer tree dividing the data written into memory into blocks to be written to disk storage; and
- using input/output vectors to swap the first set of pointers and the second set of pointers.

27. A system to handle data received by a data storage system, including operating system, including a storage operating system, comprising:
- an operating system to write data associated with a write request into a memory, the memory divided into a plurality of file system buffers using a first set of pointers;
- a processor to insert the data written into the memory directly into a buffer tree using a second set of pointers, a buffer of the buffer tree dividing the data written into memory into blocks to be written to disk storage; and
- the processor to use input/output vectors to swap the first set of pointers and the second set of pointers.

28. The system of claim 27, further comprising:
the buffer tree to support a virtual disk.

29. A system to handle data received by a data storage system, including a storage operating system, comprising:
- an operating system to write data associated with a write request into a memory, the memory divided into a plurality of file system buffers using a first set of pointers;
- a processor to insert the data written into the memory directly into a buffer tree using a second set of pointers, a buffer of the buffer tree dividing the data written into memory into blocks to be written to disk storage; and
- an operating system to transfer the data written to memory to a non-volatile log.

30. A storage system, comprising:
- a storage operating system;
- non-volatile memory in communication with the storage operating system;
- a buffer cache in communication with the storage operating system, the buffer cache consisting of a plurality of file system buffers and a buffer tree;
- a network adapter in communication with the file system buffers and adapted for performing a first direct memory access (DMA) operation, the first DMA operation transferring data associated with the write request into selected file system buffers of the file system buffers;
- a small computer systems interface (SCSI) module in communication with the storage operating system and adapted for constructing a list of pointers to the selected file system buffers;

the storage operating system including a zero-copy write process adapted for grafting the selected file system buffers to the buffer tree replacing pointers to buffers of the buffer tree with the list of pointers to the selected file system buffers; and means for performing a second DMA operation, the second DMA operation transferring data from the selected file system buffers grafted in the buffer tree to the non-volatile memory.

* * * * *